July 24, 1956  F. KREIS  2,755,902
CENTRIFUGAL CLUTCH
Filed July 31, 1951
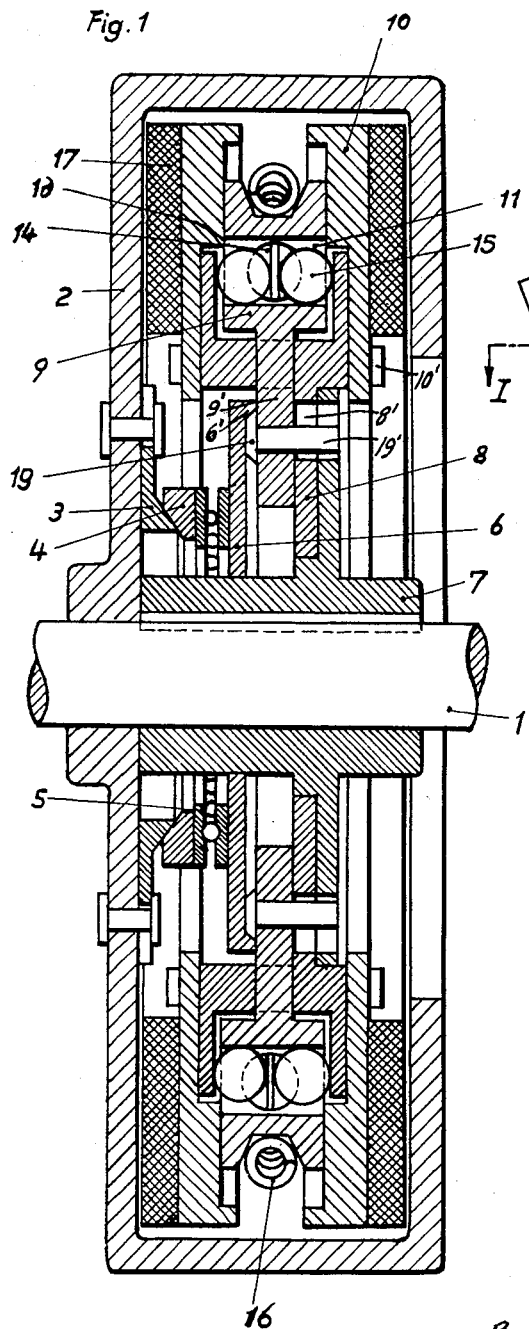
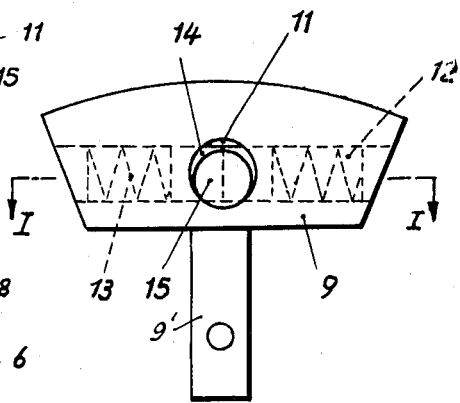
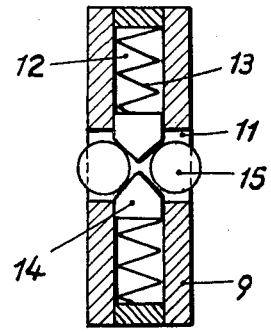
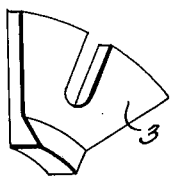
Inventor:
Fritz Kreis
By:

United States Patent Office 2,755,902
Patented July 24, 1956

2,755,902

CENTRIFUGAL CLUTCH

Fritz Kreis, Wurzburg, Germany

Application July 31, 1951, Serial No. 239,480

2 Claims. (Cl. 192—105)

This invention relates to a centrifugal clutch, particularly intended for the connection of one step of an automatically operating mechanical change speed gear with the driving engine of motor vehicles, in which the engagement is opposed by the action of resistance centrifugal weights and is effected by means of pressure members while loading a spring means.

In known clutches of this kind it has been found that the clutch linings, when disengaging, reach only gradually the fully detached position. Consequently, in many cases, slipping takes place, causing a heavy wear of the linings. Moreover it takes a long time before the linings are fully detached and the clutch can rotate freely.

These disadvantages are eliminated by the present invention inasmuch as the pressure members can move freely in their seats in all directions and, when disengaging the clutch, the pressure members pass over one edge of the pressure plates, so as to suddenly eliminate the pressure developed by the latter under the action of the spring force which has been accumulated during the engaging action.

The principle of the invention is preferably realized in such a manner, that the pressure members take the shape of balls, the diameter of which is smaller than the diameter of the bore housing them.

In the accompanying drawings the preferred embodiment of the invention is shown diagrammatically by way of example. In the drawings:

Figure 1 is a sectional view of the joint,

Figure 2 is a side view of a centrifugal weight,

Figure 3 is a sectional view on line I—I of Figure 2, and

Figure 4 shows the shape of a resistance weight.

The two halves of the centrifugal clutch are arranged on shaft 1, the outer one loose and the inner one fast. The outer clutch half has the shape of a drum 2 on which centrifugal resistance weights 3, having sector shape, are guided so as to be displaceable in radial direction. Adjacent to them there is a pressure ring 4, adjacent to this ring there is a pressure-bearing 5, and adjacent to the latter there is a pressure plate 6.

The inner clutch half consists essentially of a driving hub 7, a centrifugal weight carrier 8, of centrifugal weights 9, having sector shape too, and of two pressure plates 10.

The supporting carrier 8 has radially extending channels in which the supporting bars 9' of the centrifugal weights 9 are radially guided. The bottom walls of the channels are formed with radial slots 8' in which the pins 19' are guided. The pressure plates 10 are movable in axial direction and supported on the supporting carrier 8 by means of bolts 10'.

The centrifugal weights 9 have two bores arranged at 90°, a larger one, 11, and a minor one, 12. The minor bore 12 serves to contain pressure springs 13 and cones 14. Adjacent to the pressure cones 14 there are, in the larger bore, pressure members 15 which, in the embodiment shown, have the shape of balls and which, according to the invention, have a smaller diameter than the bore 11 housing them. Instead of balls, rollers or similar members can be used.

The centrifugal weights are tied together inwardly by the tie spring 16 in known way. Coupling linings 17 are fastened to the pressure plates 10. With the shaft 1 rotating, also hub 7, and centrifugal weights carrier 8 with centrifugal weights 9 rotate. At a sufficiently high number of revolutions, the centrifugal weights 9 overcome the force of tie spring 16 and that of the resistance weights 3 and move outwardly, the balls 15 pressing pressure plates 10 and thereby the coupling linings 17 against the inside of drum 2. Due to this pressure, the cones 14 are pushed backwards by the balls and thus the springs 13 become loaded. Therefore, the clutch halves are pressed together under a strong spring pressure and a good coupling action is obtained.

When the rotary speed of shaft 1 drops under a predetermined speed, the tie spring 16 will move the centrifugal weights 9 inwardly. During this radially inward movement in radial direction each centrifugal weight will move a certain distance until the balls 15 will contact the outwardly located surface of the larger bore 11 causing engagement of detent 19 with pressure plate 6 before the balls reach the edge 18. The full pressure action lasts until the balls reach with their contact points the edge 18 of the pressure plate 10. In this moment, due to the action of springs 13, which have been loaded during the engaging movement of the clutch, the balls 15 are pressed by cones 14, over the edge 18 inwardly against the inwardly located surface of the bores 79 of centrifugal weight carrier. This is possible due to the fact that the bore 11 is larger than the diameter of the balls so that the latter can freely move inwardly, i. e. radially inward. Thus the coupling pressure is suddenly relieved. The clutch is disengaged without a harmful slipping of joint linings 17 on the inside surface of joint drum 2. When at reduced rotary speed the centrifugal weights 9 move inwardly due to the action of the spring 17, the coupling balls 15 remain at first in coupling position while the bores 11 move relatively to the same. Then the coupling balls move together with the centrifugal weights 9 until the coupling balls are urged by the resilient means 12, 13 to move in axial and radial direction over the shoulder 18. The radial movement of the coupling balls is faster than the radial movement of the centrifugal weights 9 since the coupling balls move relatively to the same in the wider bores 11 whereby a rapid disengagement of the clutch is effected.

At the moment in which the centrifugal weights 9 engage the coupling balls 15 to move the same inwardly, the centrifugal weights 9 are also urged to move faster by the shifting means 6 and 19, since the centrifugal weight means 3 rotating with the driven clutch means 2 engage on inclined faces 6' the conical head of the members 19 urging the centrifugal weights 9 to move inwardly.

What I claim is:

1. A centrifugal clutch, comprising, in combination, a driven clutch means having two radially extending coupling faces; a drive shaft; a supporting hub means fixedly mounted on said drive shaft for rotation therewith; two symmetrically arranged pressure plates mounted on said supporting hub means movable in axial direction, each pressure plate having two radially extending faces, one of said engaging faces being located opposite one of said coupling faces of said driven clutch means for frictionally engaging the same when said pressure plate is moved toward said driven clutch means, the other of said engaging faces being stepped and composed of two concentric portions separated by a shoulder, the outer concentric portion being spaced in axial direction a greater distance from said one engaging face than said inner concentric portion; centrifugal weight means mounted on said supporting hub means movable in radial direction between an inner position and an outer position; spring means urging said centrifugal weight means to move to said inner position, said centrifugal weight means being formed with a plurality of axially extending bores arranged equally spaced from the axis of rotation of said drive shaft and having open ends located opposite said stepped engaging faces of said pressure plates and being located opposite said inner concentric portion of the correspondent pressure plate when said centrifugal weight means are in said inner position, and being located opposite said outer concentric face when said centrifugal weight means are in said outer position; a plurality of pairs of coupling ball means, each pair of coupling ball means located in one of said bores, at the open ends of the same; and resilient means including wedge-shaped means located between the coupling ball means of each pair of coupling ball means and urging said coupling ball means partly out of said bores and into engagement with the correspondent stepped face so that when said centrifugal weight means move from the outer position of the same to said inner position due to the action of said spring means against the action of the centrifugal force, said centrifugal weight means first move relatively to said coupling ball means, and then engage the same so that said coupling ball means pass from said outer concentric faces over said shoulder to said inner concentric faces whereby said pressure plates are freed to move in axial direction away from said driven clutch means effecting fast disengagement of said engaging faces from said coupling faces, said coupling ball means being urged by said resilient means to move in radial direction faster than and relatively to said centrifugal weight means within said bores so as to effect rapid disengagement of said clutch means.

2. A centrifugal clutch, comprising, in combination, a driven clutch means having two radially extending coupling faces; a drive shaft; a supporting hub means fixedly mounted on said drive shaft for rotation therewith; two symmetrically arranged pressure plates mounted on said supporting hub means movable in axial direction, each pressure plate having two radially extending faces, one of said engaging faces being located opposite one of said coupling faces of said driven clutch means for frictionally engaging the same when said pressure plate is moved toward said driven clutch means, the other of said engaging faces being stepped and composed of two concentric portions separated by a shoulder, the outer concentric portion being spaced in axial direction a greater distance from said one engaging face than said inner concentric portion; centrifugal weight means mounted on said supporting hub means movable in radial direction between an inner position and an outer position; spring means urging said centrifugal weight means to move to said inner position, said centrifugal weight means being formed with a plurality of axially extending bores arranged equally spaced from the axis of rotation of said drive shaft and having open ends located opposite said stepped engaging faces of said pressure plates and being located opposite said inner concentric portion of the correspondent pressure plate when said centrifugal weight means are in said inner position, and being located opposite said outer concentric face when said centrifugal weight means are in said outer position; a plurality of pairs of coupling ball means each pair of coupling ball means located in one of said bores, at the open ends of the same and having a dimeter smaller than the diameter of said bores; and resilient means including wedge-shaped means located between the coupling ball means of each pair of coupling ball means and urging said coupling ball means partly out of said bores and into engagement with the correspondent stepped face so that when said centrifugal weight means move from the outer position of the same to said inner position due to the action of said spring means against the action of the centrifugal force, said centrifugal weight means first move relatively to said coupling ball means, and then engage the same so that said coupling ball means pass from said outer concentric faces over said shoulder to said inner concentric faces whereby said pressure plates are urged to move in axial direction away from said driven clutch means effecting fast disengagement of said engaging faces from said coupling faces, said coupling ball means being urged by said resilient means to move in radial direction faster than and relatively to said centrifugal weight means within said bores so as to effect rapid disengagement of said clutch means.

References Cited in the file of this patent

UNITED STATES PATENTS

| | | |
|---|---|---|
| 1,947,632 | Woodruff | Feb. 20, 1934 |
| 1,948,084 | Welch | Feb. 20, 1934 |
| 2,235,107 | Kreis | Mar. 18, 1941 |
| 2,534,133 | Kirkpatrick | Dec. 12, 1950 |

FOREIGN PATENTS

| | | |
|---|---|---|
| 609,413 | France | Oct. 14, 1926 |
| 712,131 | Germany | Oct. 13, 1941 |
| 716,335 | Germany | Jan. 17, 1942 |
| 876,295 | France | July 27, 1942 |